(12) United States Patent
Sedlacek et al.

(10) Patent No.: US 7,575,113 B2
(45) Date of Patent: Aug. 18, 2009

(54) SCREEN BELT AND MODULES

(75) Inventors: Kyle J. Sedlacek, New Orleans, LA (US); Mitchell G. Pansano, Jr., Harahan, LA (US); Gilbert J. MacLachlan, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 135 days.

(21) Appl. No.: 11/307,819

(22) Filed: Feb. 24, 2006

(65) Prior Publication Data

US 2006/0185967 A1    Aug. 24, 2006

Related U.S. Application Data

(60) Provisional application No. 60/593,917, filed on Feb. 24, 2005.

(51) Int. Cl.
*B65G 17/40*    (2006.01)
*B65G 17/06*    (2006.01)
*B65G 17/30*    (2006.01)
*B65G 17/08*    (2006.01)

(52) U.S. Cl. .................. 198/850; 198/820; 198/832; 198/851; 198/844.1; 198/845; 198/846; 198/849; 198/853

(58) Field of Classification Search ................ 198/820, 198/832, 845, 846, 849, 850, 851, 844, 853
See application file for complete search history.

(56) References Cited

U.S. PATENT DOCUMENTS

| 3,093,578 | A |   | 6/1963  | Hofmeister |         |
|-----------|---|---|---------|------------|---------|
| 3,771,642 | A | * | 11/1973 | Schatte    | 198/793 |
| 3,802,565 | A |   | 4/1974  | Hughes et al. |      |
| 3,870,141 | A |   | 3/1975  | Lapeyre    |         |
| 4,051,949 | A |   | 10/1977 | Lapeyre    |         |
| 4,080,842 | A |   | 3/1978  | Lapeyre    |         |
| 4,140,025 | A |   | 2/1979  | Lapeyre    |         |
| 4,159,763 | A | * | 7/1979  | Kewley et al. | 198/853 |
| 4,171,045 | A |   | 10/1979 | Lapeyre    |         |
| 4,176,984 | A |   | 12/1979 | Sommers    |         |

(Continued)

FOREIGN PATENT DOCUMENTS

DE    10033499 A1    1/2002

(Continued)

OTHER PUBLICATIONS

Intralox, "Product Line Extension Series 1800 Mesh Top Belt," 2001, Intralox, Inc., Harahan, Louisiana, U.S.A.

(Continued)

*Primary Examiner*—Gene Crawford
*Assistant Examiner*—Kavel P Singh
(74) *Attorney, Agent, or Firm*—James T. Cronvich

(57) ABSTRACT

A modular belt constructed of belt modules having a large open area, making the belt suitable for use as a traveling water screen. The modules include an intermediate portion composed of intersecting sets of link elements and transverse elements that form a gridlike pattern. Openings bounded by the walls of consecutive link elements and transverse elements form channels through the belt for the flow of water. The modules are connected together by hinge rods to form a belt that can be used as a water screen. Detachable flights or scoops for lifting debris or fish out of a stream are attachable to base modules.

23 Claims, 8 Drawing Sheets

U.S. PATENT DOCUMENTS

| | | | |
|---|---|---|---|
| 4,188,294 A | 2/1980 | Hagihara | |
| 4,302,331 A | 11/1981 | Condit, Jr. | |
| 4,360,426 A | 11/1982 | Wetzel | |
| 4,518,494 A | 5/1985 | Jackson | |
| 4,541,930 A | 9/1985 | Heidler et al. | |
| 4,582,601 A | 4/1986 | Strow et al. | |
| 4,676,893 A | 6/1987 | Travade et al. | |
| 4,821,872 A | 4/1989 | Lapeyre | |
| 4,832,183 A | 5/1989 | Lapeyre | |
| 4,832,187 A * | 5/1989 | Lapeyre | 198/851 |
| 4,846,966 A | 7/1989 | Pastore | |
| 4,882,055 A | 11/1989 | Stamstad | |
| 4,889,629 A | 12/1989 | Jackson | |
| 4,892,652 A | 1/1990 | Rudy et al. | |
| 4,949,838 A | 8/1990 | Lapeyre et al. | |
| 5,074,406 A | 12/1991 | Gundlach et al. | |
| 5,123,524 A | 6/1992 | Lapeyre | |
| 5,213,203 A | 5/1993 | Kinney et al. | |
| 5,242,583 A | 9/1993 | Thomas | |
| 5,326,460 A | 7/1994 | Cheesman et al. | |
| RE34,688 E * | 8/1994 | Lapeyre | 198/834 |
| 5,387,336 A | 2/1995 | Bormet et al. | |
| 5,407,563 A | 4/1995 | Blake | |
| 5,415,766 A | 5/1995 | Quick et al. | |
| 5,490,591 A | 2/1996 | Faulkner | |
| 5,501,793 A | 3/1996 | Cheesman et al. | |
| 5,562,200 A * | 10/1996 | Daringer | 198/844.2 |
| 5,788,839 A | 8/1998 | Gargan, Jr. et al. | |
| 5,922,195 A | 7/1999 | Pastore | |
| 6,089,379 A * | 7/2000 | Hindi | 210/387 |
| 6,187,184 B1 | 2/2001 | Reetz et al. | |
| 6,382,404 B1 | 5/2002 | Guldenfels | |
| 6,467,610 B1 * | 10/2002 | MacLachlan | 198/699.1 |
| 6,471,041 B1 | 10/2002 | Long et al. | |
| 6,474,464 B1 * | 11/2002 | Horton et al. | 198/853 |
| 6,499,587 B1 | 12/2002 | Greve | |
| 6,554,129 B2 | 4/2003 | Straight et al. | |
| 6,569,290 B2 * | 5/2003 | Johnson | 162/348 |
| 7,048,850 B2 | 5/2006 | DePaso et al. | |

FOREIGN PATENT DOCUMENTS

| | | |
|---|---|---|
| EP | 0254604 A1 | 1/1988 |
| FR | 505629 | 8/1920 |
| GB | 2254572 | 10/1992 |
| GB | 2407782 A | 11/2005 |
| WO | 01/14635 A1 | 3/2001 |

OTHER PUBLICATIONS

Intralox, "Announcing the innovative new fish screen solution that . . . ," Dec. 2003, Intralox, Inc., New Orleans, Louisiana, U.S.A.

European Patent Office, "International Search Report of PCT/US2006/006788," Jun. 27, 2006, European Patent Office, Rijswijk, the Netherlands.

* cited by examiner

SCREEN BELT AND MODULES

BACKGROUND

The invention relates generally to traveling water screens for filtering debris and fish from a stream of water and, more particularly, to an open-area modular belt suitable for operation as a traveling water screen.

Many industrial processes use water from rivers, lakes, and oceans. Water taken into an industrial plant must be filtered to prevent debris from fouling equipment and causing damage. Water screens filter out and remove debris from an influent stream before the debris can enter the plant.

Modular plastic conveyor belts, originally designed for conveying articles, have begun to be used as traveling water screens. The INTRALOX® Series 1800 MeshTop belt, manufactured and sold by Intralox, L.L.C. of Harahan, La., U.S.A., is designed to be used as a traveling water screen. The belt is a heavy-duty belt with a lot of narrow slits through it to allow water, but not debris, to flow through. The narrow slits make the belt particularly useful as a fish screen blocking small fish from dangerous turbine blades or other potentially lethal equipment or conditions. Despite the many slits, the open-area of the belt, i.e., the surface area of the belt taken up by the slits, is just 32%. In slowly moving streams, this belt works well. In fast-moving streams, such as upstream of a suction-operated cooling water intake, however, the belt may block the flow too much.

Thus, there is a need for a modular belt capable of being used as a water screen in high-flow applications.

SUMMARY

This need and other needs are satisfied by making a water screen out of a belt constructed of modules embodying features of the invention. One version of such a belt module comprises an intermediate portion that extends longitudinally from a first end to an opposite second end, transversely from a first side to a second side, and in depth from a top to a bottom. The intermediate portion includes at least three thin transverse elements spaced apart longitudinally. The transverse elements extend transversely from the first side to the second side of the intermediate portion. A first transverse element along the first end of the intermediate portion and a second transverse element along the second end of the intermediate portion bracket the other transverse element or elements. A plurality of thin link elements, spaced apart longitudinally, intersects the transverse elements to form a grid. The intersecting elements define four-sided openings bounded by two consecutive transverse elements and two consecutive link elements. The openings extend from the top to the bottom of the intermediate portion. A first plurality of hinge eyes extends longitudinally outward from the first transverse element. A second plurality of hinge eyes extends longitudinally outward from the second transverse element.

Another version of belt module useful in constructing a water screen belt comprises an intermediate portion that includes a gridwork of two sets of intersecting walls. The walls define multiple rows and columns of channels, each of which is bounded by consecutive walls of each set. The channels extend from the top to the bottom of the intermediate portion. A first plurality of hinge eyes extends longitudinally outward from the first end of the intermediate portion. A second plurality of hinge eyes extends longitudinally outward from the second end of the intermediate portion.

Yet another version of belt module comprises a plurality of parallel, generally longitudinal links, each terminating in a first hinge eye at the first end of the belt module and a second hinge eye at the second end of the belt module. A plurality of parallel transverse elements extend from the first side to the second side of the belt module and intersect the links in a gridlike pattern. The intersecting links and transverse elements form an intermediate portion of the belt module. Multiple rows and columns of channels extend from the top to the bottom of the module between the intersecting links and transverse elements.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
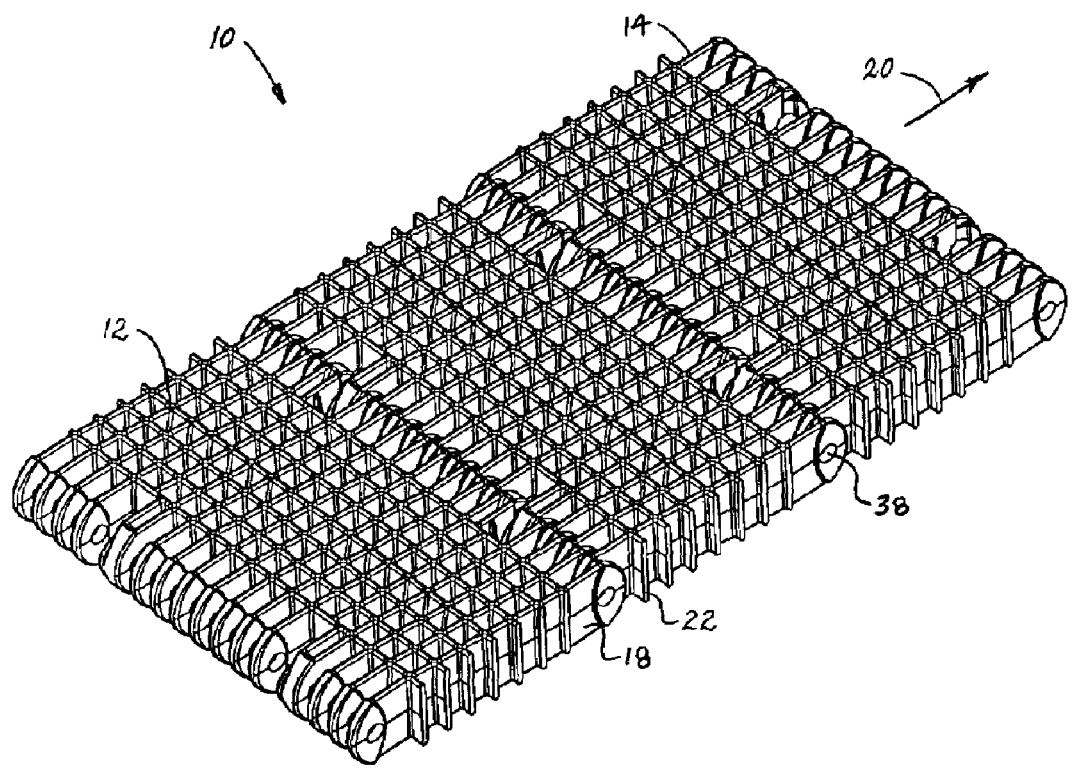
FIG. 1 is a top isometric view of a portion of a screen belt constructed of modules embodying features of the invention, including drive faces midway between leading and trailing sets of hinge eyes.
Figure 2:
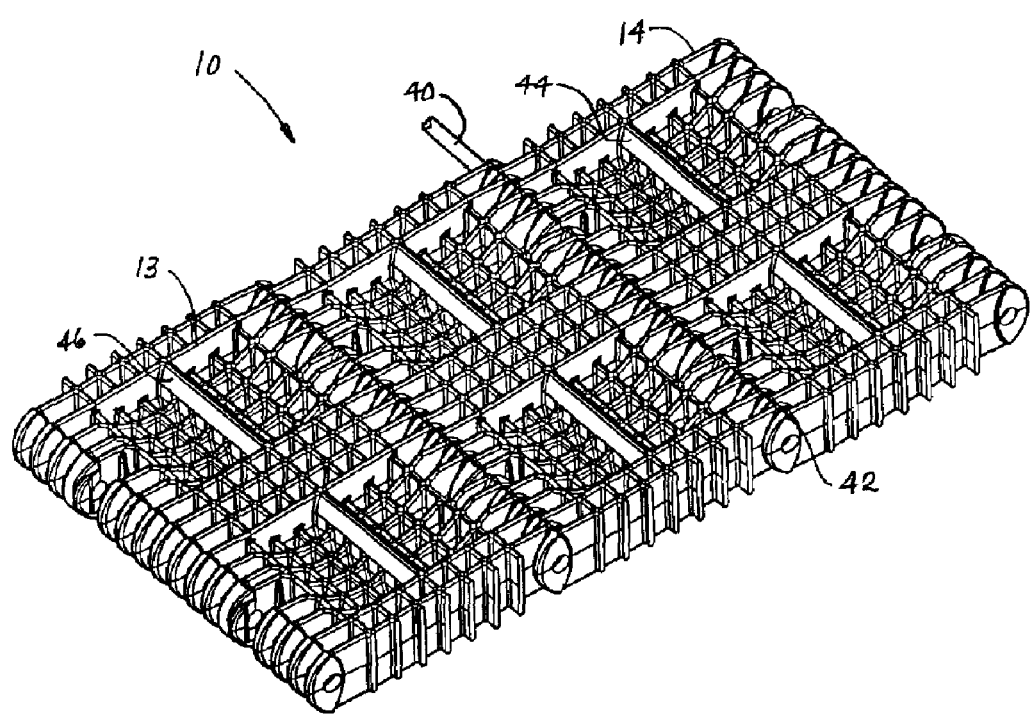
FIG. 2 is a bottom isometric view of the portion of the screen belt of FIG. 1.
Figure 3:
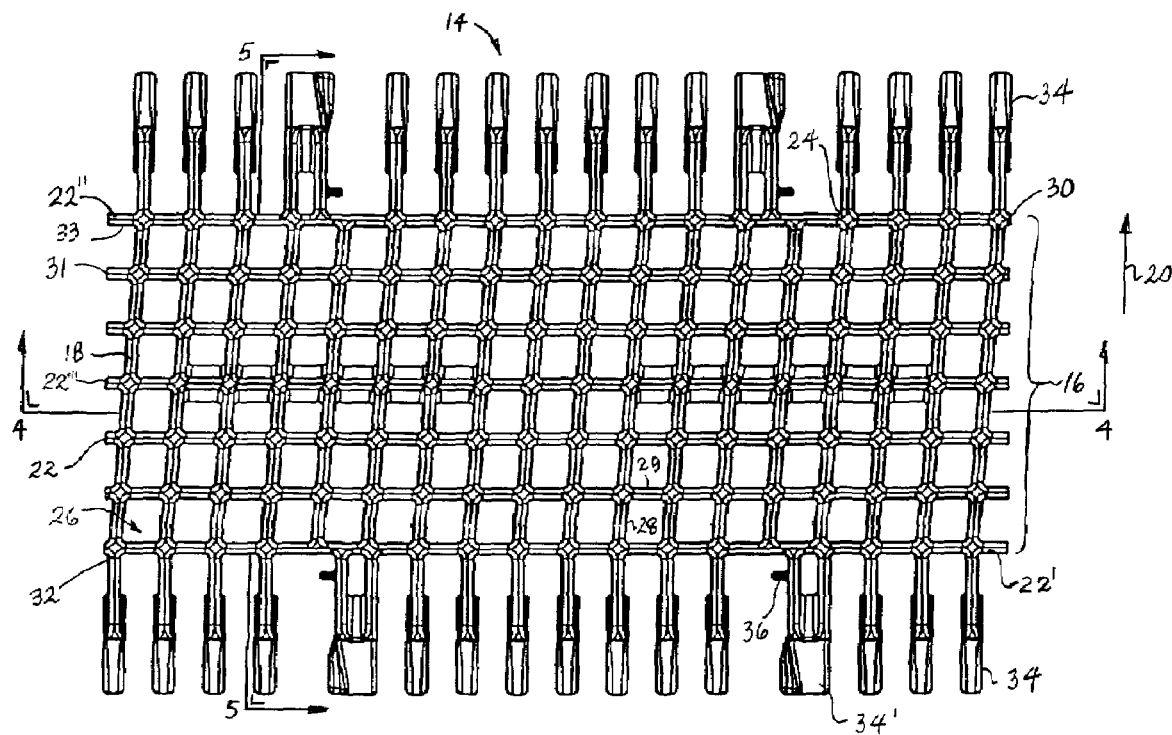
FIG. 3 is a top plan view of a module for a screen belt as in FIG. 1.
Figure 4:
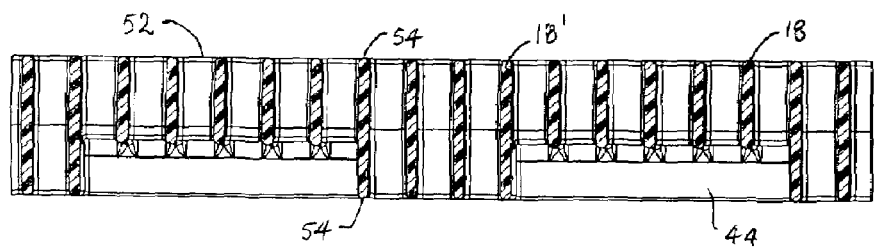
FIG. 4 is a cross section of the module of FIG. 3 taken along lines 4-4.
Figure 5:
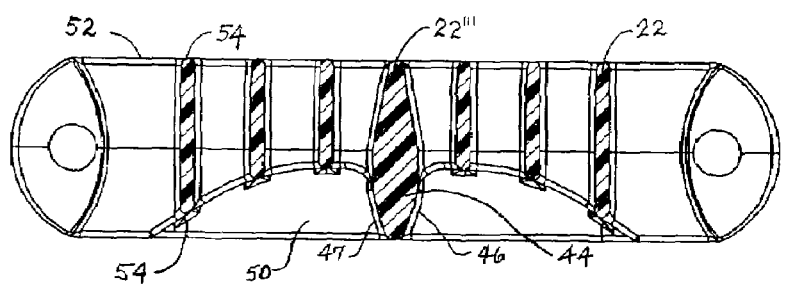
FIG. 5 is a cross section of the module of FIG. 3 taken along lines 5-5.

A portion of a modular belt 10 suitable for use as a water screen is shown in FIGS. 1 and 2. FIG. 1 shows the top, or outer, side 12 of the belt; FIG. 2 shows the bottom, or inner, side 13 of the belt. (The terms "top" and "bottom" are not restricted to a vertical relationship, but are used as conveniences to describe relative placements.) The portion of belt in the figures consists of three modules 14 connected in series. As also shown in FIGS. 3-5, each module has a rectangular intermediate portion 16 of intersecting structural members forming a gridlike pattern. One set of structural members are link elements 18 that run generally longitudinally in the direction of belt travel 20. Another set of structural members are transverse elements 22 that intersect the link elements at intersection points 24 to form the gridlike pattern. Four-sided openings 25 in the grid are defined by four walls 28, 29 of consecutive link and transverse elements. The walls extend the openings into multiple rows and columns of channels through the depth of the intermediate portion. Although, in the grid shown in the figures, a first set of continuous structural members intersects almost perpendicularly a second set of continuous structural members to form almost square openings in aligned rows and columns, the intermediate portion could alternatively be formed of discontinuous structural segments offset from one opening to another. This would provide a similar network of walled openings and open area, but consecutive openings would be staggered longitudinally or transversely or both. The crossing link and transverse elements are relatively thin compared with the dimensions of the openings to provide a large amount of open area, at least 40% and preferably 50% or more, for good water flow through the belt. To filter out debris that could clog or become wedged in 34 inch diameter cooling-water intake pipes, the length of the longest wall bounding an opening is preferably less than about ⅜ inch. The gridlike structure provides a large open area with relatively small individual channels.

The parallel transverse elements in the example of FIGS. 1-5 are spaced apart longitudinally and extend across the width of the module from a first side 30 to an opposite second side 31. A first transverse element 22' defines a first end 32 of the intermediate portion of the module; a second transverse element 22" bracketing, with the first transverse element, all the other transverse elements defines a second end 33 of the intermediate portion. Hinge eyes 34 extend outward longitudinally from the first and second transverse elements. Enlarged hinge eyes 34' are periodically spaced on the module to help index consecutive modules during assembly of a belt. Alignment stops 36 extending transversely from the sides of the enlarged hinge eyes are used to keep the hinge eyes of consecutive modules aligned during belt assembly to form a transverse passageway 38 through the interleaved hinge eyes of consecutive modules. A hinge rod 40 is then easily inserted into the passageway to form a hinge joint 42 between consecutive rows of modules. Many transversely narrow hinge eyes separated by a small transverse pitch are used rather than fewer wider hinge eyes to distribute the load more uniformly along the hinge rods to limit the maximum deformation of the rod, lengthening of the belt, and loss of belt strength.

The hinge eyes 34 may connect to the first and second transverse elements at their intersections with the link elements, as shown in FIG. 3. In this example, each hinge eye may be considered an extension of the associated link element. Alternatively, the hinge eyes may extend from the first and second transverse elements at positions offset transversely from their intersections with the link elements. Because the link elements shown in FIG. 3 are slightly oblique to the longitudinal direction of the module, the openings define parallelograms, not rectangles. If the transverse spacing between the link elements is the same as the longitudinal spacing between the transverse elements, the openings define rhombuses. But all these shapes, as well as others, are within the scope of the invention.

Figure 7:
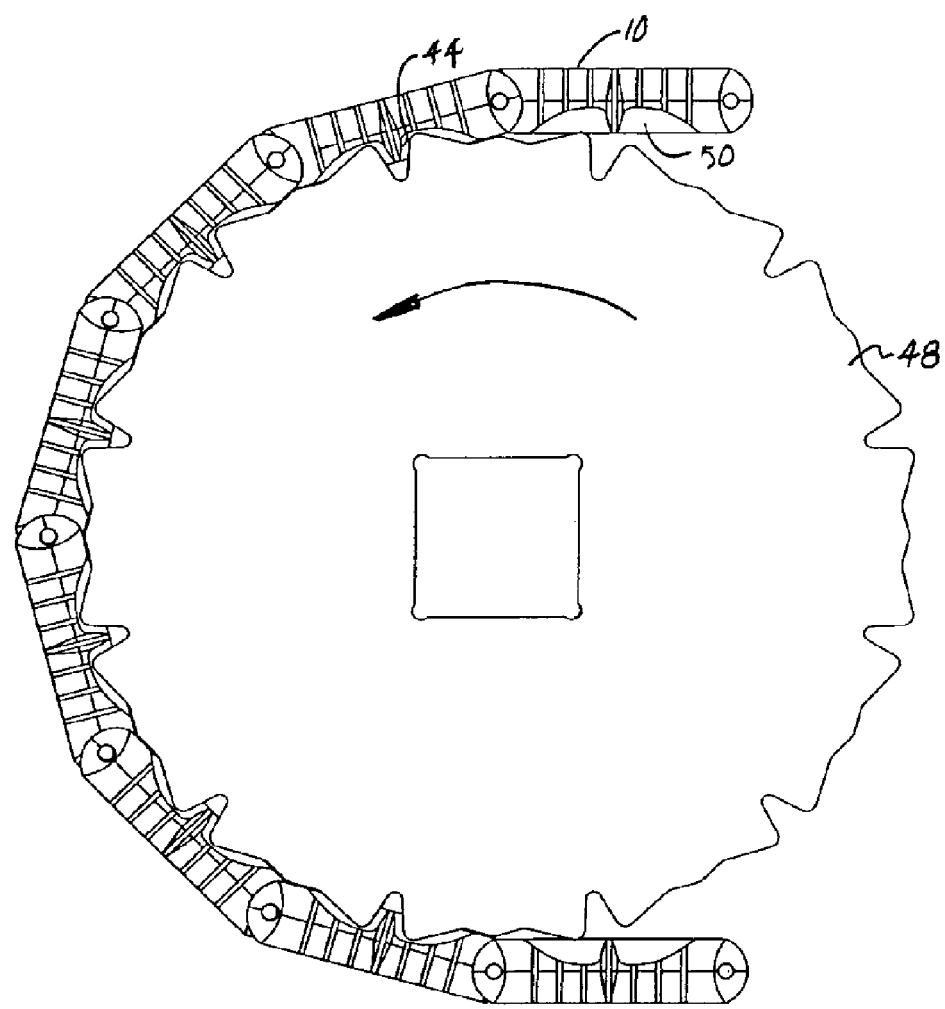
FIG. 7 is a side elevation view of a portion of a belt as in FIG. 1 articulating about a drive or idle sprocket or drum.

As shown in FIGS. 2 and 3, the module preferably has an odd number, e.g., three, five, seven, nine, and higher, of equi-spaced transverse elements with a central transverse element 22''' that includes thickened transverse protrusions 44 periodically spaced along the bottom of the module. The transverse protrusions may serve as drive teeth with drive faces 46, 47 formed on leading and trailing sides of the protrusion. The drive teeth are engaged by a drum or sprocket 48, as shown in FIG. 7, to advance the belt. A recess 50 is formed in the bottom of the module at each drive tooth to admit the sprocket. The protrusion 44 divides the recess into two sections. Consequently, as shown in FIGS. 4 and 5, the link elements 18 and the transverse elements 22 vary in depth to form the recesses. For example, as shown in FIG. 4, some of the link members, such as link members 18' are constant in depth, extending from the top of the intermediate portion to the bottommost level of the bottom of the intermediate region to form a divider between consecutive recesses. The divider helps the sprocket and belt track to keep the belt and sprockets from wandering transversely. The transverse elements 22, as shown in FIG. 5, have different depths in the vicinity of the transverse projection to form the concave curved recess 50. Although the bottoms of the link and transverse members follow a curved contour, the tops are preferably coplanar to form a flat outer belt surface 52.

Figure 6:
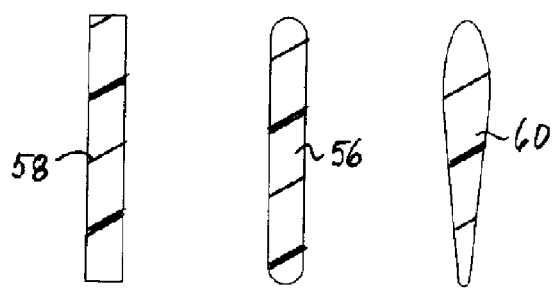
FIG. 6 illustrates three alternative cross sections of link and transverse members as in a module in FIG. 4.

The cross section of each link element or transverse element in FIGS. 4 and 5 is in the shape of a rectangle with rounded, or blunt, ends 54. The rounded rectangle shape 56 is shown in the middle of FIG. 6. The link and transverse elements could alternatively have rectangular shapes 58 or airfoil shapes 60. The blunt rectangle and the airfoil provide less resistance than the flat rectangle to water flow through the belt. This improved hydrodynamic performance makes these two shapes preferable in high-flow conditions.

Figure 8:
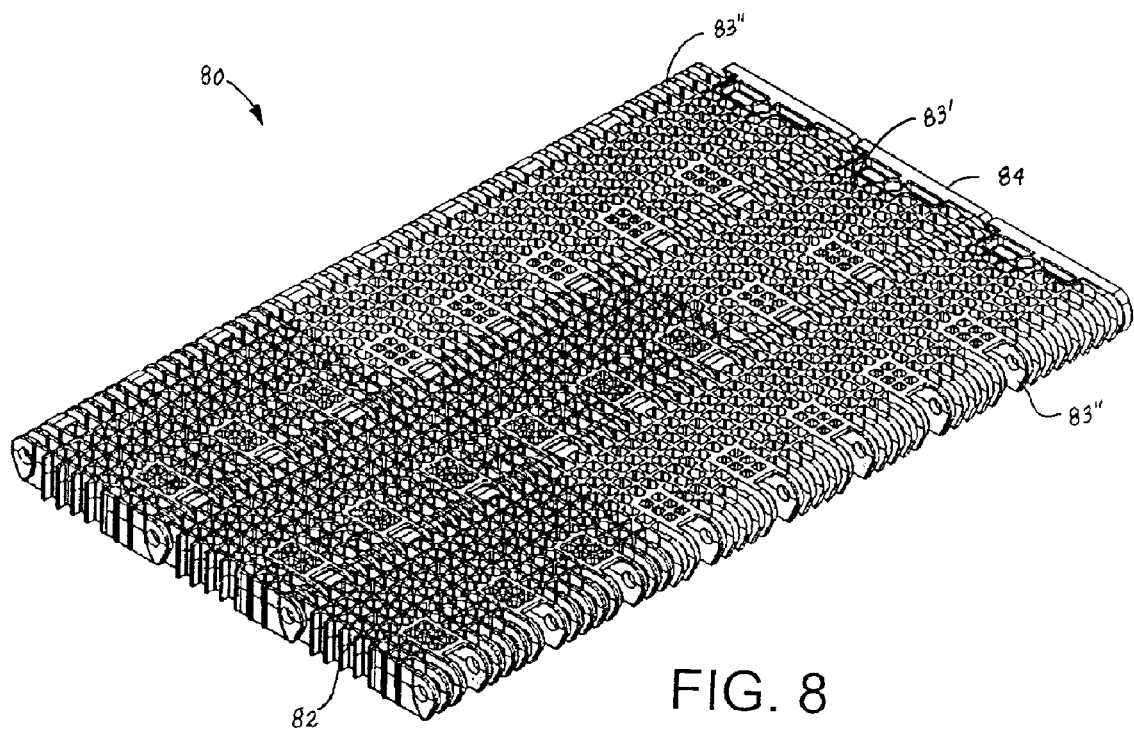
FIG. 8 is a top isometric view of a portion of one sill of another version of a screen belt constructed of modules embodying features of the invention, including drive faces on wide hinge eyes.
Figure 9:
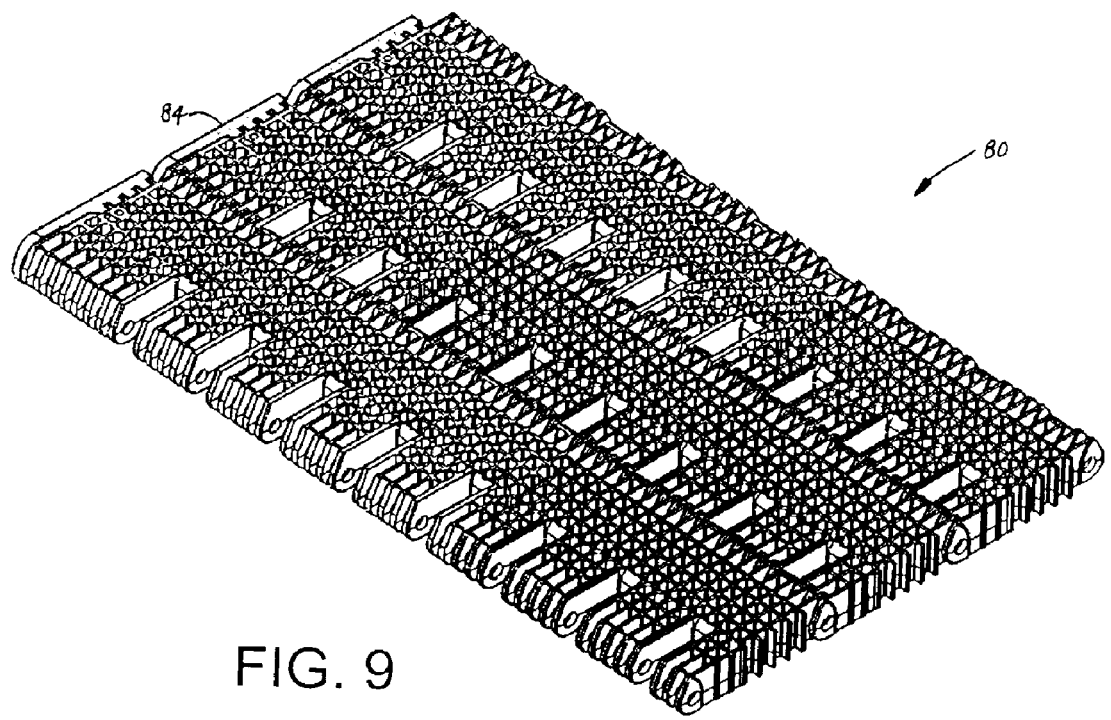
FIG. 9 is a bottom isometric view of the portion of the screen belt shown in FIG. 8.

A portion of another modular belt 80 usable as a water screen is shown in FIGS. 8 and 9. The belt includes internal modules 82 and edge modules 83 (short 83' and long 83"). Because only one side of the belt is shown in FIGS. 8 and 9, only one outside edge 84 of the belt is depicted. Like the belt of FIGS. 1 and 2, this belt is modular and connected at hinge joints by hinge rods. The different-width edge modules allow the belt to be constructed in a bricklay pattern for strength.

Figure 10:
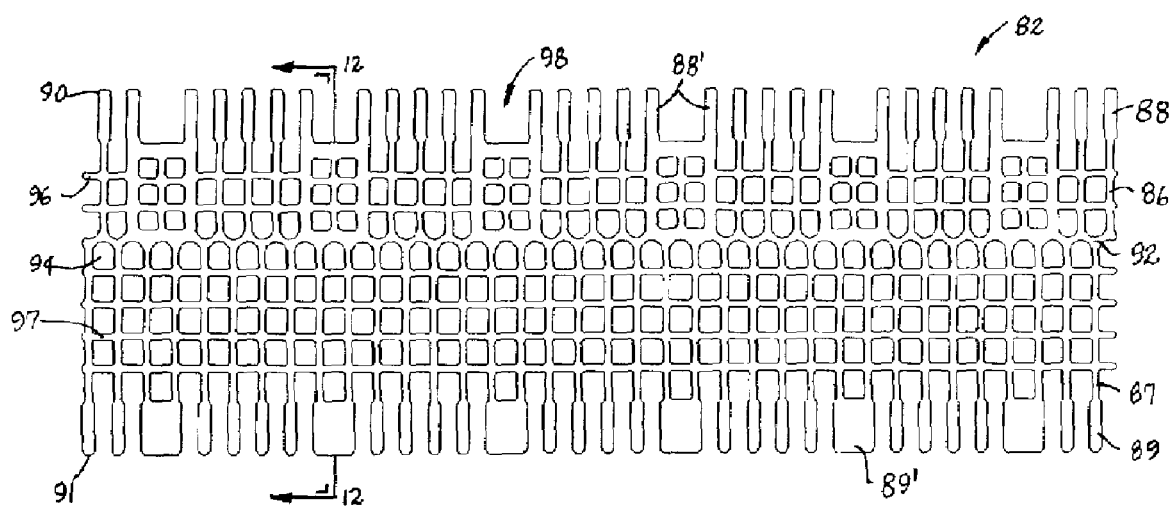
FIG. 10 is a top plan view of an internal module of the screen belt of FIG. 8.
Figure 11:
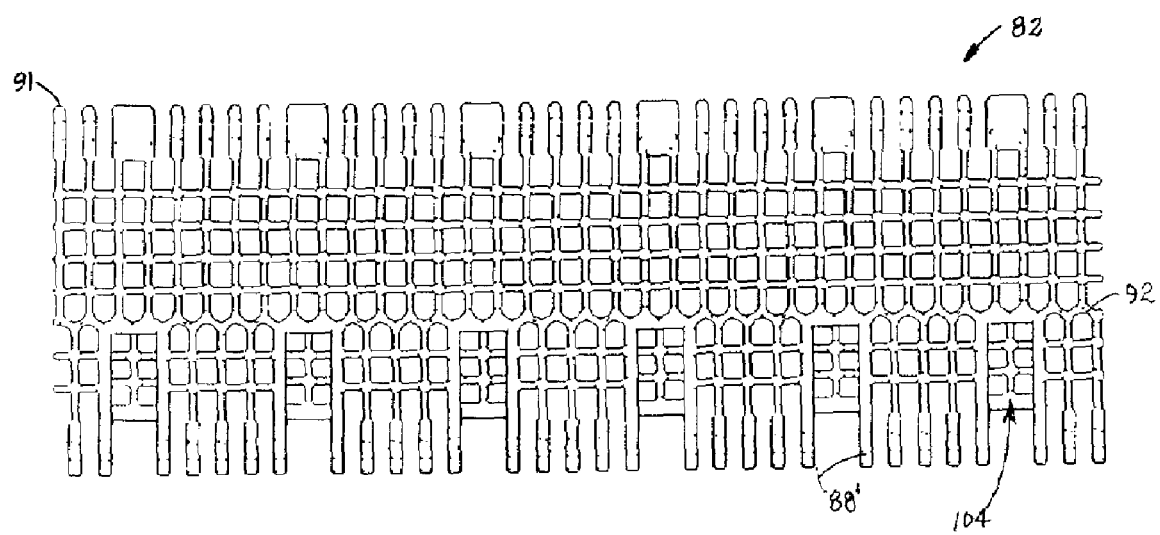
FIG. 11 is a bottom plan view of the interior module of FIG. 10.

The structural differences between the modules of FIG. 1 and FIG. 8 are best shown in the internal modules 82 depicted in plan view in FIGS. 10 and 11. A first set of link elements 86 extends longitudinally inward from first hinge eyes 88 along a first end 90 of the module. A second set of link elements 87 extends longitudinally inward from second hinge eyes 89 along an opposite second end 91 of the module. The links of the first set are preferably laterally offset from the links of the second set. The first and second sets terminate inwardly on opposite sides of a transverse junction element 92. To increase the module's open area, the junction element has a corrugated shape forming mailbox-door-shaped openings 94 on either side. But a straight junction element could alternatively be used. First transverse elements 96 intersect the first link elements 86 between the first end and the junction element to form a gridlike pattern. Second transverse elements 97 intersect the second link elements 87 to form a gridlike pattern between the second end of the module and the junction element. Wide hinge eyes 89' at the distal ends of two adjacent second link elements are periodically spaced along the second end of the module. Adjacent yoke hinge eyes 88' of the first set of hinge eyes are separated by a gap 98 wide enough to receive a wide hinge eye of an adjacent module. The wide hinge eyes along the second end of a module are in line with the gaps along the first end of the module.

Figure 12:
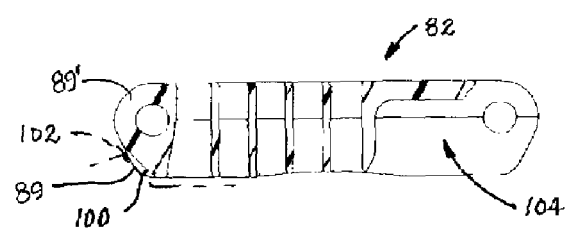
FIG. 12 is a cross sectional view of the module of FIG. 10 taken along line 12-12 of FIG. 10.

As shown in FIG. 12, the lower distal edge of the wide hinge eye 89' forms a flat drive surface 100 at a shallower angle than the lower edges of the other hinge eyes 89. The shallower angle increases the contact area between the drive surface and the tooth 102 of a drive sprocket during engagement and lessens point contact and associated wear. Drive pockets 104 are formed in the underside of the module between the yoke hinge eyes 88' and the junction element 92 to admit the sprocket teeth. Unlike the belt of FIG. 1, a belt made of the modules of FIGS. 10-12 is driven at the hinge on the drive surface 100 of the wide hinge elements 89'.

Figure 13:
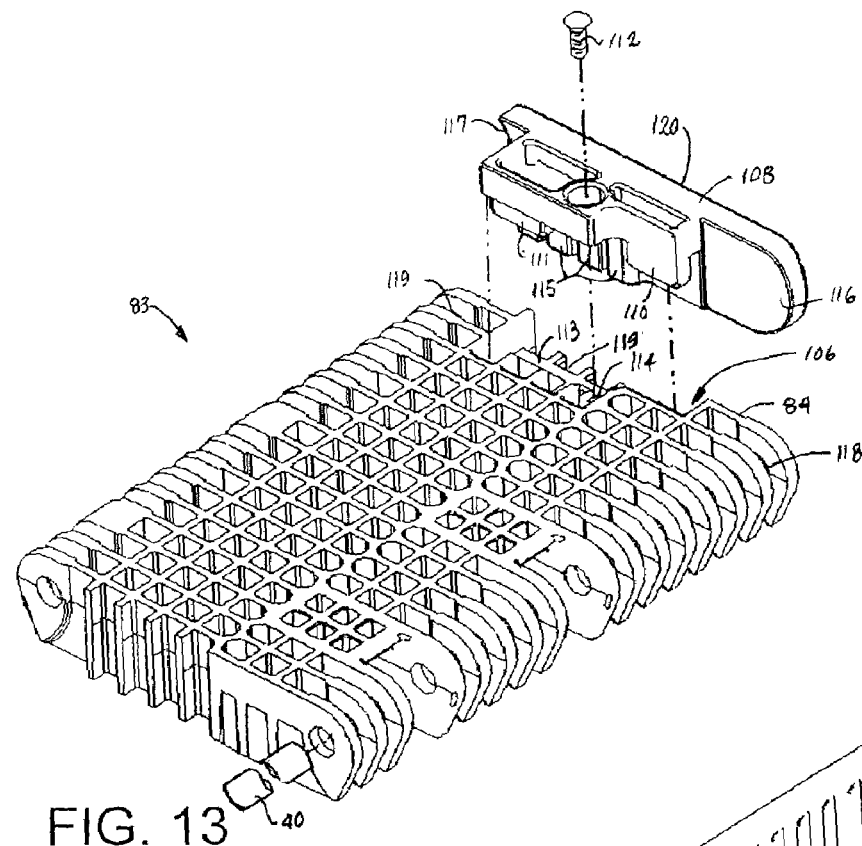
FIG. 13 is an exploded view of an edge module of the screen belt of FIG. 8.

An edge module 83, shown in FIG. 13, is structured similarly to the internal modules 82. But the outside edge 84 of the module includes a recess 106 for a removable hinge rod retainer 108. The retainer resides in the recess. Elongated posts 110, 111 on the retainer rest on a shelf 113 defining the bottom of the recess. Tabs 115 on the retainer fit into channels 119 formed by the ends of the transverse elements at the outside edge of the module to prevent the retainer from moving longitudinally and rotating. A fastener, such as a bolt or screw 112 received in a threaded opening 114 attaches the retainer to the module. A protrusion 116 on the front of the retainer covers the outermost front hinge rod holes 118 to prevent a hinge rod 40 from migrating beyond that side of the belt. The rear of the retainer has a concave surface 117 to accommodate the protrusion of the retainer of the trailing row. The retainer has a flat outside face 120 to give the belt a flush outside edge that avoids snagging.

Figure 14:
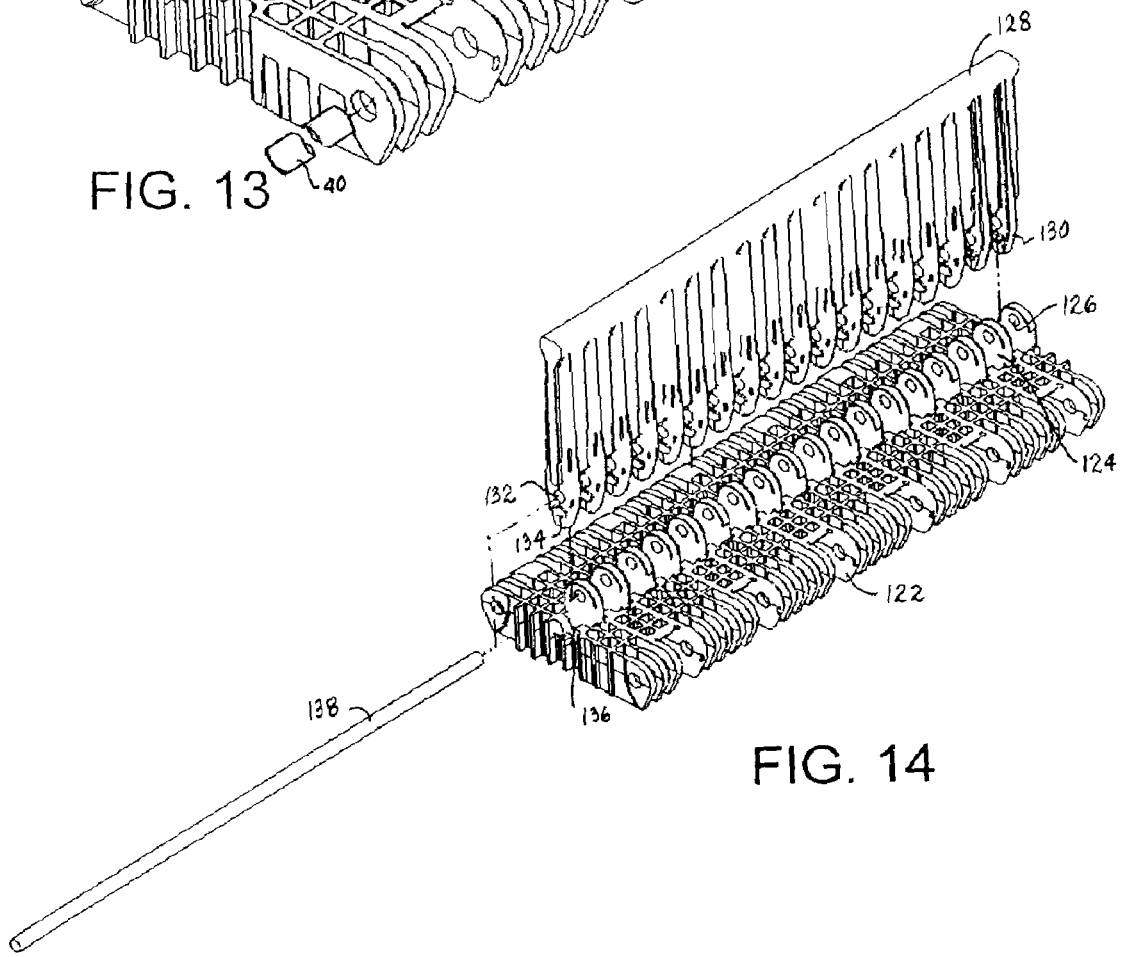
FIG. 14 is an exploded view of an internal base module with a detachable flight usable in a screen belt as in FIG. 8.

As shown in FIG. 14, a belt module 122 has a central row of upstanding posts 124 with lateral bores 126 for attaching attachment members, such as flights, to the module. A flight attachment 128 with depending legs 130 has similar laterally aligned bores 132. Tapered ends 134 of the legs reside in tapered recesses 136 in the top of the module between consecutive posts. A connecting pin 138 extends through the aligned bores of the posts and the legs of the flight to retain it in place. If damaged, the flight may be easily replaced. The flight serves to lift debris impinging on the upstream face of the water screen out of the water for removal. The flight base modules 122 can be installed on every row, but are preferably spaced a few rows apart. Standard modules 82 are used in flightless belt rows.

Figure 15:
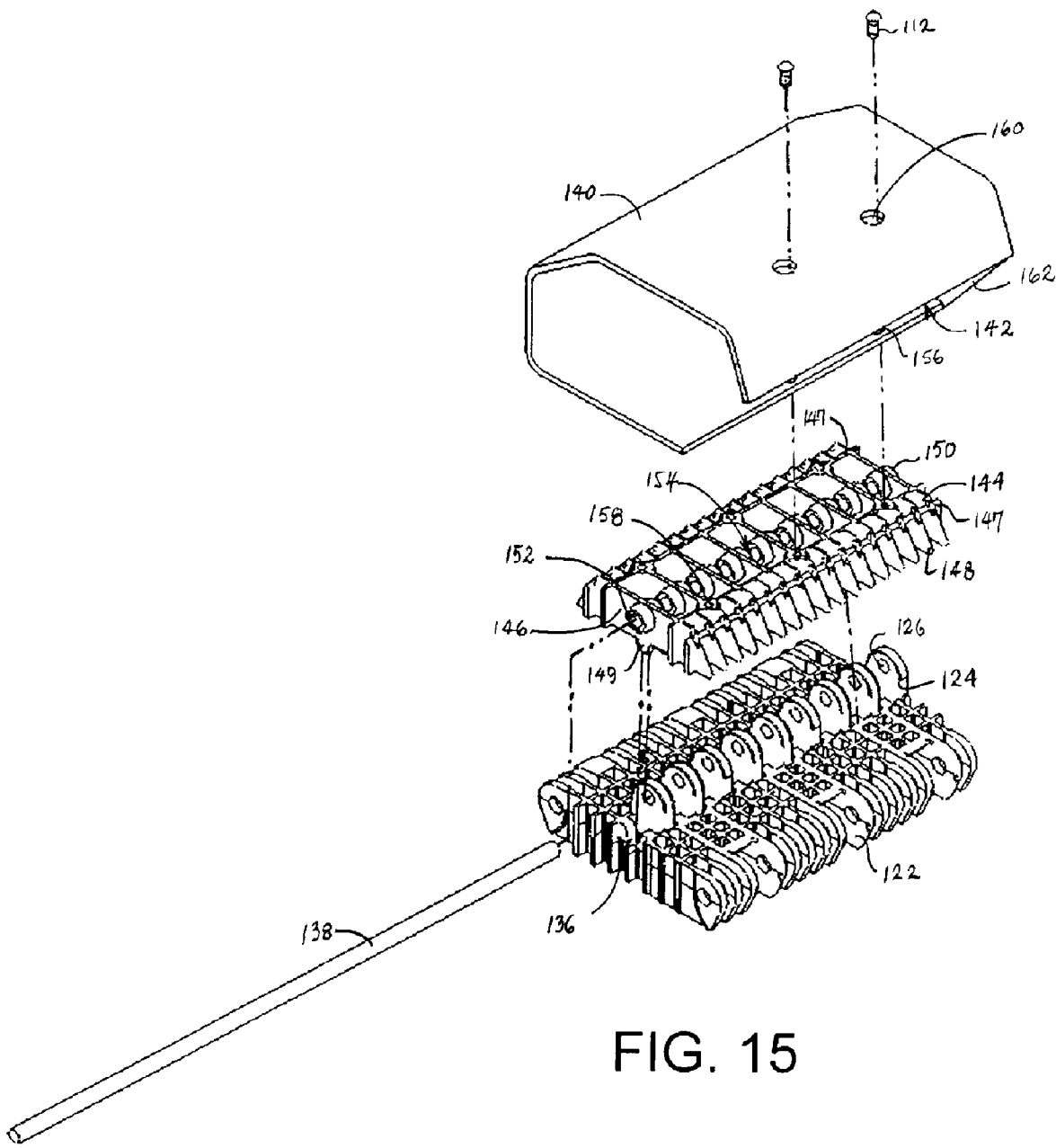
FIG. 15 is an exploded view of an internal base module with a detachable scoop usable in a screen belt as in FIG. 8.

Another attachment that can be used to scoop fish out of the stream is shown in FIG. 15. A scoop or bucket 140 attaches to a base module 122. The scoop is generally C-shaped in cross section with an opening 142 that faces upward along the upstream face of the water screen. The scoop attaches to an attachment member, such as an adapter 144 that mounts to the base module. The adapter includes sets of parallel longitudinal vanes 146 that sit atop the base module. Cross elements 147 add structural integrity to the module, and buttresses 148 extending from outermost cross elements provide further support. A tooth 149 centrally located on the bottom of each vane is received in the recesses 136 in the base module. Bosses 150 with bores 152 extend from each side of the vanes. Confronting bosses on consecutive vanes are separated by a gap 154 spaced to admit a post 124. With the bores in the bosses aligned with the bores 126 in the posts, a connecting pin 138 is received in the passageway formed by the aligned bores to removably hold the adapter to the base module. Bolts or screws 112 extending through openings 156 in the scoop and into threaded bosses 158 in the adapter retain the scoop to the adapter. Access holes 160 provide screwdriver access to the heads of the screws. A number of scoop elements may be attached across the width of the water screen. The scoop elements at the outer sides of the screen include an endplate 162 to confine the fish within the scoop. The interior scoop elements could include endplates, but are preferably open-ended to form a long scoop closed only at the edges of the water screen. Other functional elements besides a scoop, such as hooks, spikes, or posts, for example, could be attached to the generic adapter.

All the modules and attachments are preferably molded out of thermoplastic polymers in an injection molding process. The flights and, more particularly, the scoops could alternatively be made of metal. Typical thermoplastic polymers include polypropylene, polyethylene, acetal, nylon, and composite materials. The modules are connected together in rows preferably in a bricklay pattern for strength. Connecting pins and hinge rods made out of molded or extruded thermoplastic polymers or composite materials or made of stainless steel attach the attachments to the modules and connect the rows of belt modules together into an endless belt loop.

Figure 16:
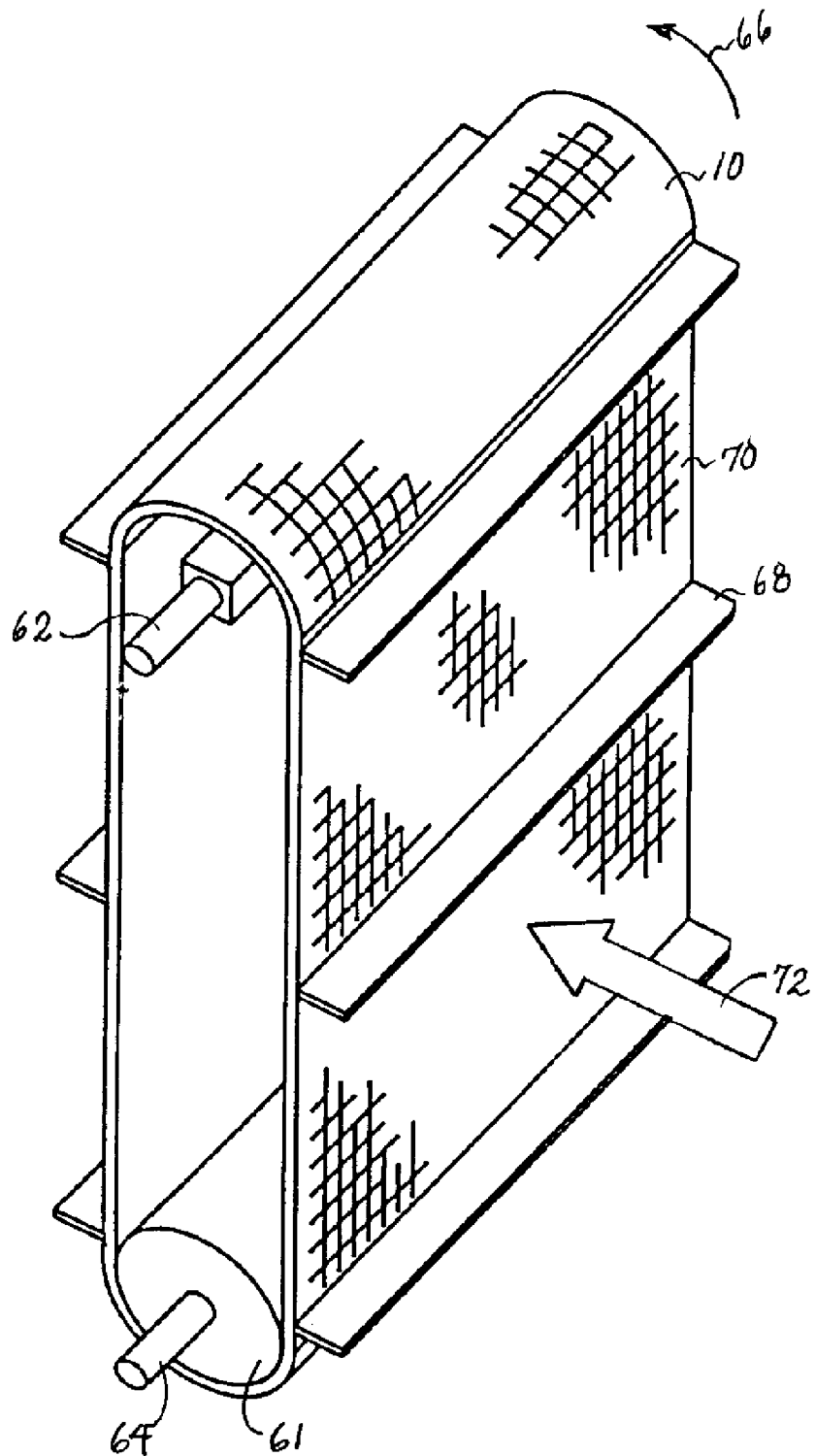
FIG. 16 is an isometric view of a portion of a water screen system using a belt as in FIG. 1 or FIG. 8.

As shown in FIG. 16, the belt loop 10 is trained about sprockets 48 or drums 61 on an upper head shaft 62 (sprockets not shown) and a lower boot shaft 64. A motor coupled to the head drive shaft advances the belt in the direction of arrow 66. The belt includes modules such as those in FIG. 1 and flight modules 68 as in FIG. 14. The grid structure of the modules makes the belt suitable for use as a traveling water screen. Preferably the water screen is arranged vertically with its major upstream face 70 generally perpendicular to the flow 72 of the stream. The open area of the belt permits the stream to flow through, and the grid blocks fish and debris. The flights lift the blocked debris out of the stream as the water screen belt advances.

Thus, an effective water screen that is useful in high-flow conditions can be built using a modular conveyor belt.

Although the invention has been described with respect to a few preferred versions, other versions are possible. For example, the belt module can have an even number of transverse elements and a different drive structure from those shown. Furthermore, the belt may be useful other than as a water screen. For example, an application requiring air or other fluid flow through the belt could use the modular belt described. So, as these examples suggest, the scope of the claims is not meant to be limited to the preferred versions described in detail.

What is claimed is:

1. A belt module suitable for use in a water screen belt advancing in a direction of belt travel, the belt module comprising:

an intermediate portion having a first end and a second end spaced from the first end in a longitudinal direction parallel to the direction of belt travel, a first side and a second side spaced from the first side in a transverse direction perpendicular to the longitudinal direction, and a top and an opposite bottom defining from the top to the bottom the depth of the intermediate portion, the intermediate portion including:

at least three thin transverse elements spaced apart in the longitudinal direction and extending in length in the transverse direction from the first side to the second side, with a first transverse element along the first end of the intermediate portion and a second transverse element along the second end bracketing the other transverse element or elements, wherein the thin transverse elements have their narrowest dimension in the longitudinal direction, and a plurality of thin link elements spaced apart in the transverse direction and extending in length generally in the longitudinal direction to intersect the transverse elements to form a grid of transverse elements and link elements defining four-sided openings bounded by two consecutive transverse elements and two consecutive link elements and extending from the top to the bottom of the intermediate portion, wherein the thin link elements have their narrowest dimension in the transverse direction to provide, with the intersecting thin transverse elements, the intermediate portion with a large amount of open area for water flow through the four-sided openings;

wherein portions of the lengths of some of the transverse elements and link elements extend from the top of the intermediate portion to shallower depths than other portions of the lengths of the same or other transverse elements and link elements;

a first plurality of hinge eyes extending in the longitudinal direction outward from the first transverse element and having aligned openings forming a first passageway extending through the first plurality of hinge eyes in the transverse direction and a second plurality of hinge eyes extending in the longitudinal direction outward from the second transverse element and having aligned openings forming a second passageway extending through the first plurality of hinge eyes in the transverse direction;

wherein the module has an open area of at least 40%.

2. A belt module as in claim 1 wherein the four-sided openings are parallelogram-shaped.

3. A belt module as in claim 2 wherein the four-sided openings are rhombus-shaped.

4. A belt module as in claim 2 wherein the four-sided openings are rectangular.

5. A belt module as in claim 1 wherein the link elements are oblique to the transverse elements.

6. A belt module as in claim 1 wherein one of the transverse elements has a corrugated shape.

7. A belt module as in claim 1 wherein each link element is uniquely associated with one of the first plurality of hinge eyes at the first end of the intermediate section and with one of the second plurality of hinge eyes at the second end of the intermediate section.

8. A belt module as in claim 1 wherein a central transverse element forms at least one thickened transverse protrusion extending from the bottom of the intermediate portion.

9. A belt module as in claim 8 wherein the bottom of the intermediate portion forms a curved concave recess divided by the transverse protrusion.

10. A belt module as in claim 1 comprising an odd number of transverse elements in the intermediate portion.

11. A belt module as in claim 1 wherein a cross section of a transverse member has a shape selected from the group consisting of a rectangle, a rectangle with rounded ends, and an airfoil.

12. A belt module as in claim 1 wherein a cross section of a link member has a shape selected from the group consisting of a rectangle, a rectangle with rounded ends, and an airfoil.

13. A belt module as in claim 1 wherein the module has an open area of over 50%.

14. A belt module as in claim 1 wherein a minority of the first plurality of hinge eyes are periodically spaced wide hinge eyes each formed at the distal ends of two consecutive link elements and wherein each wide hinge eye includes a flat drive surface at the lower distal edge of the hinge eye forming a shallower angle than the lower distal edges of the other hinge eyes.

15. A belt module as in claim 1 further comprising periodically spaced drive pockets each bounded by two widely spaced consecutive hinge eyes of the second plurality of hinge eyes and the transverse element from which the two hinge eyes extend.

16. A belt module as in claim 1 further comprising a hinge rod retainer and a recess at the first side of the module shaped to receive the retainer, wherein the hinge rod retainer includes:

a protrusion that extends along the hinge eye of the first plurality of hinge eyes that is closest to the first side of the module to block a hinge rod from exiting the hinge eye; and tabs that fit in channels formed between the ends of consecutive transverse elements at the first side of the module to restrict the motion of the retainer relative to the belt module.

17. A belt module as in claim 1 further comprising:

a transverse row of posts upstanding from the top of the intermediate portion and forming aligned bores therethrough;

an attachment having attachment structure interleaved with the posts, the attachment structure forming bores arranged in line with the bores through the posts to form a transverse passageway; and a connecting pin received in the passageway to retain the attachment to the top of the intermediate portion.

18. A belt module as in claim 17 wherein the attachment member is a flight.

19. A belt module as in claim 17 wherein the attachment member is an adapter to which a functional element can be removable attached.

20. A belt module as in claim 19 wherein the functional element is a scoop.

21. A modular water screen belt comprising a plurality of hinge pins and a plurality of belt modules as in claim 1 arranged in rows, wherein the first plurality of hinge eyes of a module are interleaved with the second plurality of hinge eyes of an adjacent module with the first and second passageways through the interleaved hinge eyes aligned in the transverse direction for receiving a hinge rod to connect adjacent rows of modules together at hinge joints between rows.

22. A belt module suitable for use in a water screen belt, the belt module, comprising:

an intermediate portion extending longitudinally from a first end to an opposite second end, transversely from a first side to a second side, and in depth from a top to a bottom, the intermediate portion including:

a gridwork of two sets of intersecting walls defining multiple rows and columns of channels, each channel bounded by consecutive walls of each set, the channels extending from the top to the bottom of the intermediate portion, wherein adjacent channels are separated by the narrowest dimension of the wall separating the adjacent channels to provide the intermediate portion with a large amount of open area for water flow through the channels;

a first plurality of hinge eyes extending longitudinally outward from the first end of the intermediate portion and a second plurality of hinge eyes extending longitudinally outward from the second end of the intermediate portion;

wherein the walls bounding each channel are each less than ⅜ inch in length.

23. A belt module extending longitudinally in a module length direction, transversely in a transverse direction perpendicular to the length direction from a first side to a second side, and in depth from a top to a bottom, and suitable for use in a water screen belt, the belt module comprising:

a plurality of parallel, generally longitudinal links, each terminating in a first hinge eye at the first end of the belt module and a second hinge eye at the opposite second end, each longitudinal link having its narrowest dimension in the transverse direction;

a plurality of parallel transverse elements extending from the first side of the belt module to the second side of the belt module and intersecting the links in a gridlike pattern forming an intermediate portion of the module with rows and columns of channels extending from the top to the bottom of the module and bounded by walls formed by the intersecting links and transverse elements, wherein each transverse element has its narrowest dimension in the module length direction to provide, with the intersecting longitudinal links, the belt module with a large amount of open area for water flow through the channels;

wherein the walls bounding each channel are each less than $3/8$ inch in length.

* * * * *